(12) United States Patent
Fleming et al.

(10) Patent No.: US 6,961,840 B2
(45) Date of Patent: Nov. 1, 2005

(54) METHOD AND APPARATUS FOR MANAGING A DYNAMIC ALIAS PAGE TABLE

(75) Inventors: Matthew David Fleming, Austin, TX (US); Mark Douglass Rogers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 10/262,056

(22) Filed: Sep. 30, 2002

(65) Prior Publication Data

US 2004/0064672 A1 Apr. 1, 2004

(51) Int. Cl.[7] .............................................. G06F 12/00
(52) U.S. Cl. ...................... 711/207; 711/202; 711/203; 711/206; 711/208; 711/209; 711/216; 711/221
(58) Field of Search ................................. 711/202, 203, 711/206, 207, 208, 209, 216, 221

(56) References Cited

U.S. PATENT DOCUMENTS 6,578,131 B1 * 6/2003 Larson et al. ............... 711/216

OTHER PUBLICATIONS

Per–Ake Larson, Dynamic Hash Tables, Apr. 1988, Communications of ACM, vol. 31, pp 446–457.*
Enbody et al., Dynamic Hashing Schemes, Jun. 1988, ACM Computing Surveys, vol. 20, pp 85–113.*
Swanberg, Atomic Memory Migration Apparatus and Method.

* cited by examiner

*Primary Examiner*—Donald Sparks
*Assistant Examiner*—Bao Quoc Truong
(74) *Attorney, Agent, or Firm*—Duke W. Yee; Mark E. McBurney; Theodore D. Fay, III

(57) ABSTRACT

A method and apparatus for managing a dynamic alias page table are provided. With the apparatus and method, alias page table entries are added to an alias page table dynamically by determining if the alias page table has space for the entry and, if so, the entry describing the virtual address to physical address mapping is added to the alias page table and a successful completion is returned to the virtual memory manager. If the alias page table does not have space for the entry, a new page is used to map the next virtual page of the alias page table. This page must be marked as a fixed page if it not so marked already. This page is pinned in the software page frame table, and the hardware page table entry for this page is also pinned.

17 Claims, 3 Drawing Sheets

METHOD AND APPARATUS FOR MANAGING A DYNAMIC ALIAS PAGE TABLE

BACKGROUND OF THE INVENTION

1. Technical Field

The present invention is directed to a method and apparatus for managing a dynamic alias page table. Specifically, the present invention is directed to a mechanism for dynamically determining if a new page of memory is needed for storing alias page table entries and pinning entries in a hardware page table associated with such a new page in order to avoid faults on the alias page table.

2. Description of Related Art

In operating systems it is desirable to support a mechanism for shared memory, i.e. memory that can be addressed by multiple processes but which is a single block of memory. Shared memory allows one process to write data that can be read by a different process. Though there is a single physical frame per page of this shared memory, there will be as many virtual addresses that map to the physical frame as there are processes that have attached the shared memory.

In the AIX operating system, an alias page table (APT) is used to manage these aliases for a physical address. Because AIX uses an inverted software page table (that is, it has a single entry per physical frame that describes a virtual frame mapped to that physical frame), when more than one virtual address maps to the same physical address, a separate table is necessary to record the extra mappings, or aliases.

The hardware on which the AIX operating system runs supports a hardware page frame table that is a large cache of the virtual-to-physical translations in the system. It is a hashed table with fixed size hash buckets, so it is possible that, when the hash buckets become full, there are translations that exist in software that are not in hardware. When a process attempts access to a virtual address that is not in the hardware page table but is in software managed tables, this is termed a reload fault, as the hardware translation must be reloaded from the software. The hardware supports the pinning of entries in the hardware table. These pinned entries will not be removed by the hardware when a hash group becomes full, and thus a reload fault on a pinned entry cannot happen.

The alias page table is used to manage the translations of the various virtual addresses to physical addresses and provide for resolving reload faults on alias addresses at interrupt level. Typically, the memory regions needed to maintain the alias page table are allocated when the virtual memory manager is initialized. Thus, there is a fixed amount of memory that is provided for storing alias information even if the alias page table currently is empty or underutilized.

With the ability to have aliases in hardware, a special table for most software aliasing is not needed except for shared memory regions being used for input/output operations. The memory used to fully describe the aliases is large and is not pinned. Reload faults on aliased memory can be serviced from these descriptions without a special table when interrupts are enabled. However, reload faults on aliases cannot be serviced at interrupt level with the standard structures that describe the aliases; hence the need for an alias page table which records the minimum information about the aliases necessary for servicing reload faults. Because shared memory is not often used for input/output operations, the alias page table will typically be empty or underutilized. As a result, there is allocated memory that goes unused and thus, system resources are wasted. Furthermore, since the alias page table is used to resolve reload faults, no reload faults can be allowed on the table itself.

Thus, it would be beneficial to have a method and apparatus for managing a dynamic alias page table in which alias page table entries are created dynamically and reload faults on the alias page table itself are handled.

SUMMARY OF THE INVENTION

The present invention provides a method and apparatus for managing a dynamic alias page table. With the apparatus and method of the present invention, alias page table entries are added to an alias page table dynamically by determining if the alias page table has space for the entry and, if so, the entry describing the virtual address to physical address mapping is added to the alias page table and a successful completion is returned to the virtual memory manager.

If the alias page table does not have space for the entry, a new page is used to map the next virtual page of the alias page table. This page must be marked as a fixed page if it not so marked already. This page is pinned in the software page frame table, and the hardware page table entry for this page is also pinned. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
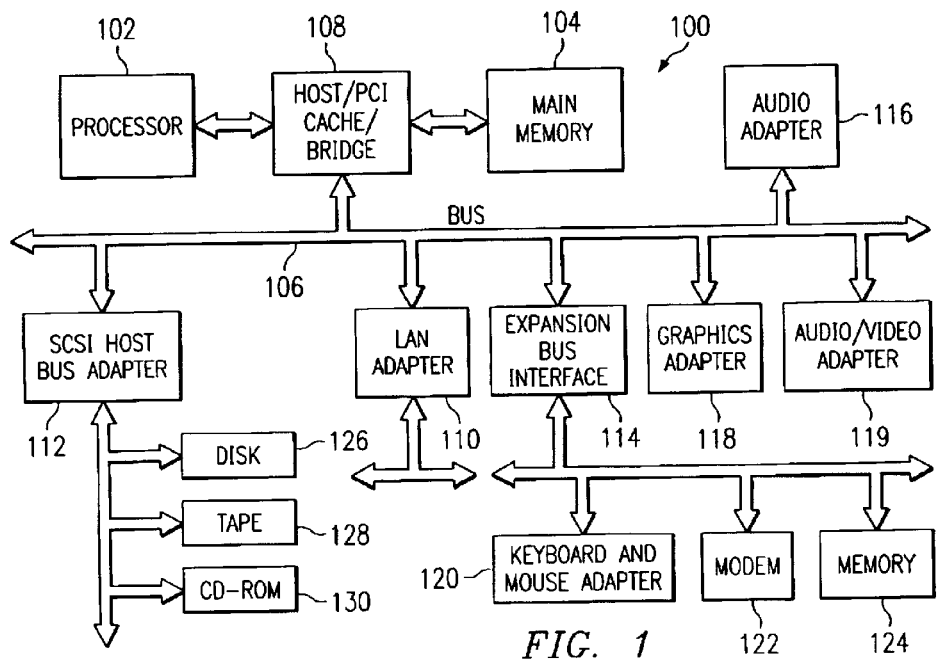
FIG. 1 is an exemplary block diagram of a computing device in accordance with the present invention.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. In a preferred embodiment, however, the operating system running on processor 102 is the Advanced Interactive Executive (AIX) operating system, available from International Business Machines, Incorporated.

An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 is not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126–130.

Figure 2:
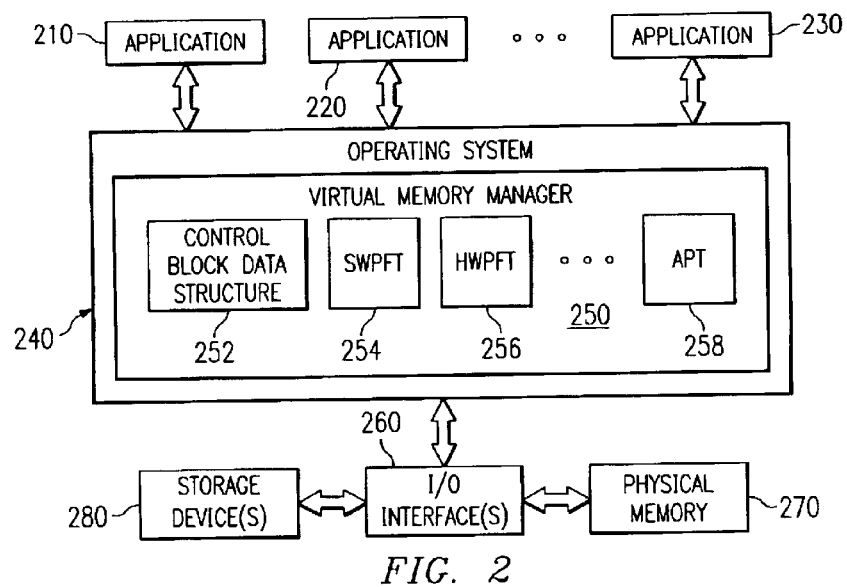
FIG. 2 is an exemplary block diagram illustrating a virtual memory manager in accordance with the present invention.

FIG. 2 is an exemplary block diagram illustrating a virtual memory manager in accordance with the present invention. As shown in FIG. 2, the applications 210–230 perform operations on data files by sending instructions to the operating system 240 to perform such data file operations. In a system in which virtual memory is utilized, a virtual memory manager 250 is provided in the operating system 240 for managing the virtual memory and translating between virtual addresses used by the applications 210–230 and physical address of the physical memory 270.

The virtual memory manager 250 maintains a number of data structures for managing the virtual memory. These data structures include a control block data structure 252, a software page frame table (SWPFT) 254, a hardware page frame table (HWPFT) 256, an alias page table (APT) 258, and the like. The HWPFT 256 is used by the system hardware to perform data access operations on data stored in physical memory. The HWPFT 256 maps virtual addresses used by the software to physical addresses of those pages of memory that are going to be regularly accessed by the system hardware, e.g., the processor.

In the event that the HWPFT 256 does not include an entry for a particular mapping of virtual to physical address, a page fault on the HWPFT 256 is generated. The page fault is handled by a fault handler of the virtual memory manager 250 which attempts to access the SWPFT 254 to identify the mapping and attempt to reload the mapping into the HWPFT 256. If the SWPFT 254 does not include the requested mapping, the fault handler of the virtual memory manager 250 then attempts to resolve the reload fault by identifying an alias mapping corresponding to the virtual address in the alias page table 258. If there is no corresponding alias mapping, then a page fault is handled by the operating system 240 in a known manner.

Figure 3:
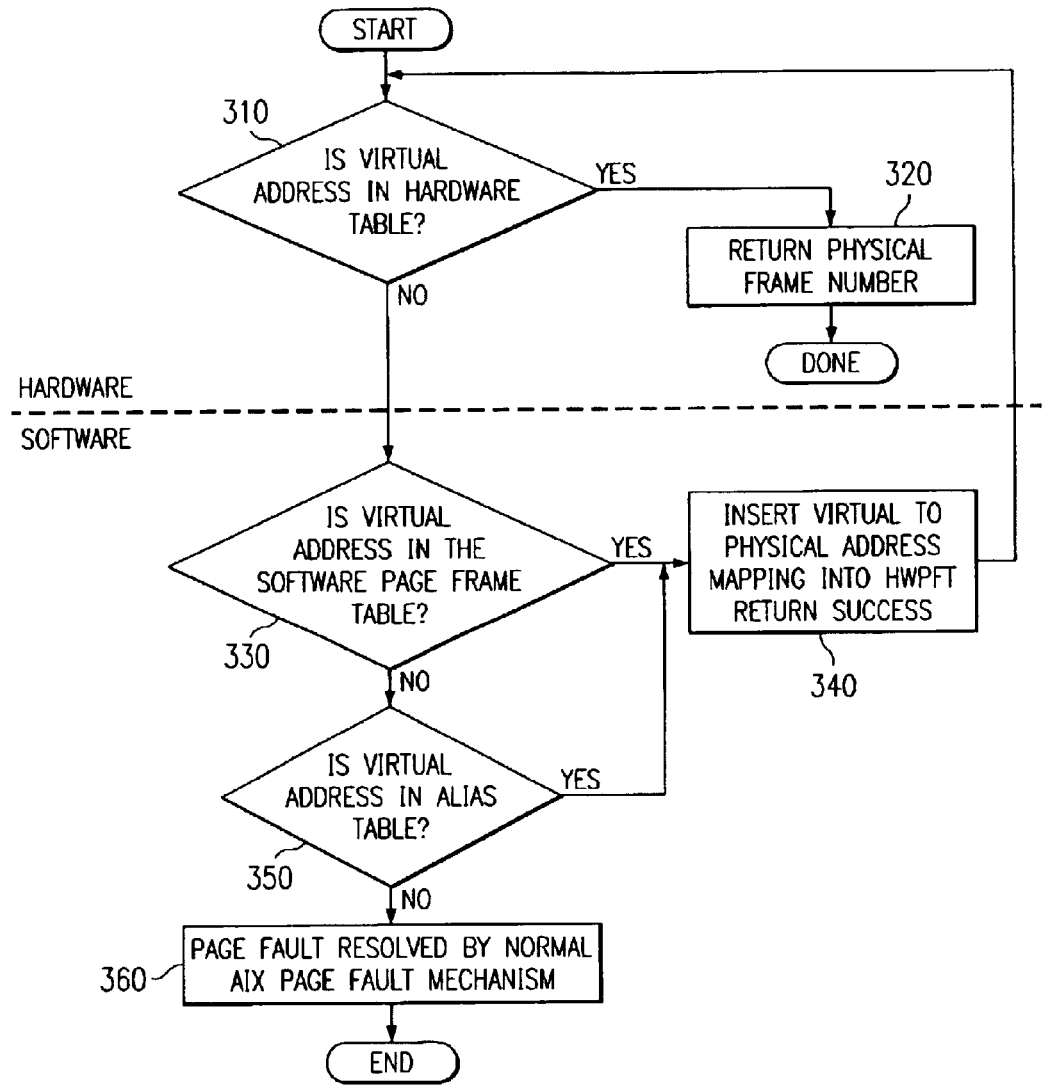
FIG. 3 is a flowchart outlining an exemplary operation for translating a virtual address into a physical address.

FIG. 3 is a flowchart outlining an exemplary operation for resolving a virtual address. As shown in FIG. 3, when the hardware, e.g., the processor, must resolve a virtual address in order to access a portion of physical memory, the processor first determines if the virtual address is present in the hardware page frame table (step 310). If the hardware page frame table contains an entry corresponding to the virtual address, the physical frame number identified by the mapping in the entry is returned (step 320) and the operation ends.

If the hardware page frame table does not include an entry corresponding to the virtual address, a reload fault is generated. A hash on the virtual address is generated in order to look into the software page frame table to determine if the software page frame table contains a corresponding entry (step 330). If the software page frame table contains an entry corresponding to the virtual address, as determined by following the hash chain through the software page frame table, the mapping identified in the entry in the software page frame table is reloaded into the hardware page frame table (step 340) and the operation returns to step 310, where it is very likely that the hardware will now find the mapping for this virtual address.

If the software page frame table does not have an entry corresponding to the hash of the segment identifier and page number, a hash into the alias page table is performed on the virtual address. A determination is made as to whether the alias page table contains an entry corresponding to the virtual address (step 350). If so, then the mapping in the alias page table entry is reloaded into the hardware page frame table (step 340) and the operation returns to step 310. If a corresponding entry is not present in the alias page table, a page fault is returned to the operating system which resolves the page fault using its known page fault handler mechanism (step 360).

As discussed previously, the alias page table, in known systems, is typically allocated at initialization of the virtual memory manager and thus, is static rather than dynamic. The present invention provides a mechanism for adding entries to the alias page table dynamically and thereby, reducing the size of the alias page table in memory. Moreover, the present invention provides a mechanism for handling faults on the alias page table itself.

With the apparatus and method of the present invention, alias page table entries are added to an alias page table dynamically by determining if the alias page table has space for the entry. If the alias page table has space for the entry, the entry describing the virtual address to physical address mapping is added to the alias page table and a successful completion is returned to the virtual memory manager.

If the alias page table does not have space for the entry, an attempt is made at obtaining a page of memory from a pool of fixed memory pages allocated at system initialization. If the pool of fixed pages has an available page, an entry is added to the software page frame table for the translation between the virtual address of the new APT page and the physical address of the fixed page and the entry is pinned in the software page frame table. An entry is then added and pinned in the hardware page frame table for the translation to the fixed page in a similar manner.

If neither the alias page table nor the pool of fixed pages has space for the new entry, a new page of APT entries is obtained by using the normal page fault handler. This frame is then pinned in the software page frame table and an attempt is made to add this new page to a fixed page interval. This interval describes all fixed pages in the system and at boot time contains the fixed page pool as well as other memory that cannot be moved.

In way of explanation, as described in co-pending and commonly assigned U.S. patent application Ser. No. 10/261,864, entitled "Atomic Memory Migration Apparatus and Method," filed on Sep. 30, 2002, now U.S. Pat. No. 6,804,729 which is hereby incorporated by reference, AIX allows the possibility of migrating pages at runtime from one physical address to another, either to improve data locality or to support the dynamic removal of memory. When migrating a page from one physical frame to another its translation in the hardware and software must be temporarily removed. During this time the memory cannot be accessed. For most system memory and all application memory this does not present a difficulty, but for data structures which are pinned in the hardware page table, this cannot be allowed. So a set of ranges (referred to as an interval) is used to describe all the fixed memory in the system, which includes the memory used for the alias page table.

If the addition of the new page to the fixed page interval is not completed successfully, the new page is unpinned in the software page frame table and a special code is returned to the calling routine. In response to receiving this special code, the calling routine uses a dynamic memory allocator to extend the fixed page memory interval and again calls the service to add the mapping to the APT.

If the page is successfully added to the fixed interval, the virtual to physical mapping of this page is added and pined in the hardware page frame table.

Figure 4:
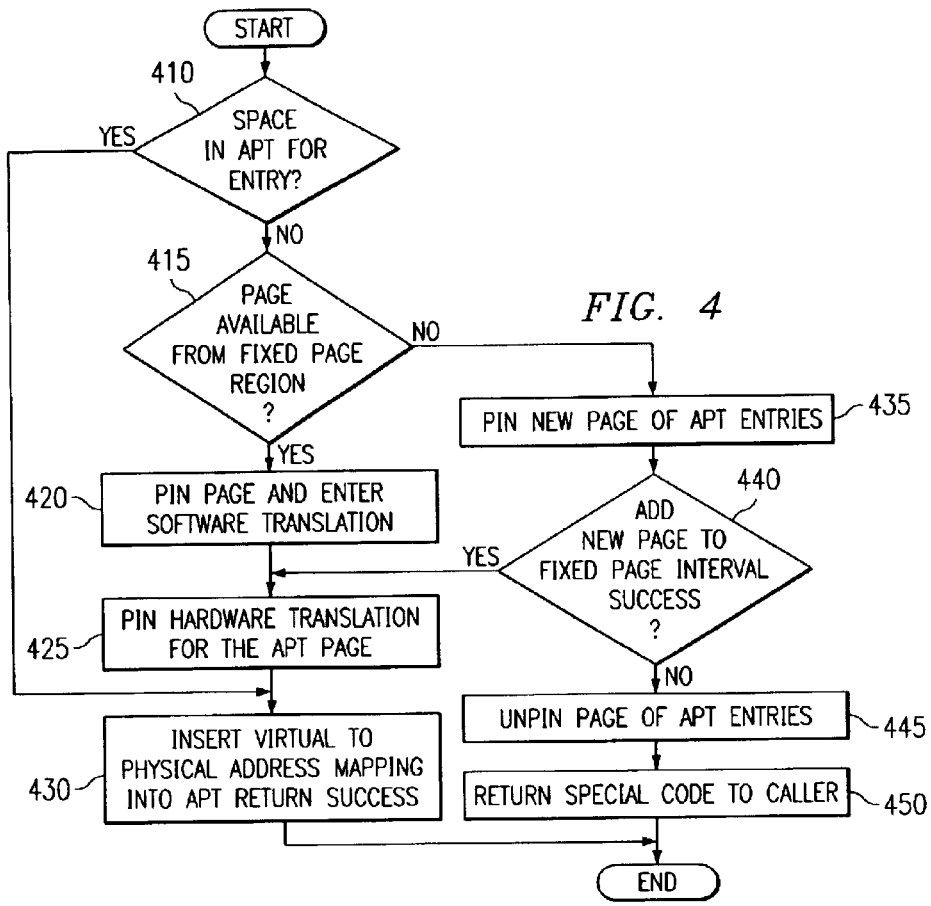
FIG. 4 is a flowchart outlining an exemplary operation of the present invention for managing a dynamically created alias page table.

FIG. 4 is a flowchart outlining an exemplary operation of the present invention for dynamically adding an entry to a dynamically created alias page table. The operations of FIG. 4 are performed by the virtual memory manager of the operating system kernel. As shown in FIG. 4, the operation starts with a determination as to whether the alias page table already has space for the new entry (step 410) by checking for an item in the list of free APT entries. If the alias page table has space for the new entry, an entry for the mapping from virtual address to physical address is added to the alias page table and success is returned to the calling routine (step 430).

If the alias page table does not have space for the new entry, a determination is made as to whether there is a page available from a fixed page region of memory by checking for a free item in the list of fixed pages (step 415). The fixed page region is a region of a few pages that is set aside at initialization time for the use of the virtual memory manager. These real pages are intended to be used to back virtual address ranges that contain data that cannot be relocated, such as the APT. By preallocating a small region of pages that are marked as fixed, the system will hopefully rarely need to dynamically mark a page as fixed, thus providing good locality of fixed pages and leaving a majority of ranges of memory as non-fixed.

If there is a page available in the fixed page region of memory, the page is pinned and the mapping for the virtual address of the next page of APT entries to the physical address of the page just obtained from the fixed page region is added to the software page frame table (step 420). A hardware page frame table entry is then added that describes this mapping and is also pinned (step 425). The requested mapping is then added to the alias page table (step 430) and the operation ends.

If the fixed page region does not have a page available, a new page of alias page table entries is obtained using the normal page fault mechanism. This page is then pinned (step 435). An attempt is then made to add the new page of the alias page table to the fixed page interval (step 440). If the addition is successful, the virtual to physical address mapping of the newly pinned page is added to the hardware page frame table and is pinned in the hardware table (step 425). The requested mapping is then added to the alias page table (step 430) and the operation ends.

If the new page of the alias page table could not be added to the fixed page interval, the new page of the alias page table is unpinned (step 445). A special code is returned to the calling routine (step 450) and the operation ends. The calling routine is responsible for requesting again that the alias mapping be added, as described below in FIG. 5.

Figure 5:
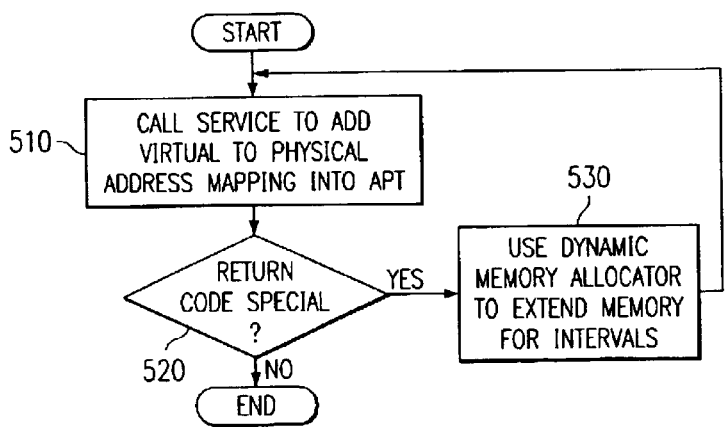
FIG. 5 is a flowchart outlining an exemplary operation of a calling routine in response to receiving a special code from the alias page table management operation.

FIG. 5 is a flowchart outlining an exemplary operation of a calling routine in response to receiving a special code from the alias page table management operation. As shown in FIG. 5, the calling routine calls the service described in FIG. 4 in an attempt to add the mapping of the virtual address to physical frame number to the alias page table (step 510). If the result of the attempt is the return of a special code indicating that the addition of the mapping to the alias page table could not be completed successfully (step 520), the calling routine calls a service to add more free entries for the fixed interval. This service uses a dynamic memory allocator service to extend the memory for the fixed page interval (step 530) and returns to step 510. In this case, when the operation in FIG. 4 is again attempted, the determination in step 440 will be positive and the operation will branch to step 425.

An example of the dynamic memory allocator service that may be used with the present invention is a kernel version of the malloc service, which is generally known in the art. Of course other dynamic memory allocator services may be used without departing from the spirit and scope of the present invention.

Thus, the present invention provides a mechanism for adding entries to an alias page table such that the alias page table is created dynamically. As a result, the memory required to hold the alias page table is kept to a minimum. Moreover, the present invention provides a mechanism for avoiding faults on the alias page table by pinning the translation from APT virtual address to physical address in the hardware at runtime.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computing device, for adding entries to an alias page table, comprising:
   determining if there is available space in the alias page table for a new entry;
   allocating, in response to there not being available space in the alias page table for the new entry, a new page of memory for use in storing alias page table entries;
   pinning an entry associated with the new page of memory in a hardware page table in response to allocating the new page of memory for use in storing alias page table entries;
   wherein allocating a new page of memory includes:
      determining if a pool of fixed memory pages includes an available fixed memory page; and
      allocating the available fixed memory page for use in storing alias page table entries; and
   wherein allocating the new page of memory further includes:
      pinning the available fixed memory page in a software page table.

2. The method of claim 1, further comprising:
   determining if a pool of fixed memory pages includes available space for the new entry, wherein, in response to a determination that the alias page table and the pool of fixed memory pages do not have available space for the new entry, allocating the new page of memory includes:
   pinning a new page of alias page table entries in a software page table;
   determining if a fixed page interval has available space for addition of the new page of alias page table entries; and
   adding the new page of alias page table entries to the fixed page interval if the fixed page interval has available space.

3. The method of claim 2, wherein, it the fixed page interval does not have available space, the method further comprises:
   unpinning the new page of alias peg table entries in the software page table; and
   sending a code to a calling routine indicating that the new page of alias page tables could not be allocated.

4. The method of claim 3, wherein the calling routine invokes a dynamic memory allocator to extend the fixed page memory interval in response to receiving the code.

5. The method of claim 1, wherein the new entry in the alias page table includes a virtual to physical address mapping translation.

6. The method of claim 1, wherein the method is implemented dynamically during runtime.

7. The method of claim 1, wherein allocating the new page of memory for use in storing alias page table entries includes:
   determining if a fixed page interval is full;
   extending the fixed page interval if the fixed page interval is full; and
   adding a pinned page of a software page table to the fixed page interval.

8. A computer program product tangibly embodied in a computer readable storage medium for adding entries to an alias page table, comprising:
   first instructions for determining if there is available space in the alias page table for a new entry;
   second instructions for allocating, in response to there not being available space in the alias page table for the new entry, a new page of memory for use in storing alias page table entries;
   third instructions for pinning an entry associated with the new page of memory in a hardware page table in response to allocating the new page of memory for use in storing alias page table entries;
   wherein the second instructions for allocating a new page of memory include:
      instructions for determining if a pool of fixed memory pages includes an available fixed memory page; and
      instructions for allocating the available fixed memory page for use in storing alias page table entries; and
   wherein the second instructions for allocating the new page of memory further include:
      instructions for pinning the available fixed memory page in a software page table.

9. The computer program product of claim 8, further comprising:
   fourth instructions for determining if a pool of fixed memory pages includes available space for the now entry, wherein, in response to a determination that the alias page table and the pool of fixed memory pages do not have available space for the new entry, the second instructions for allocating the new page of memory include:
   instructions for pinning a new page of alias page table entries in a software page table;
   instructions for determining if a fixed page interval has available space for addition of the new page of alias page table entries; and instructions for adding the new page of alias page table entries to the fixed page interval if the fixed page interval has available space.

10. The computer program product of claim 9, wherein, if the fixed page interval does not have available space, the computer program product further comprises:
   instructions for unpinning the new page of alias page table entries in the software page table; and
   instructions for sending a code to a calling routine indicating that the new page of alias page tables could not be allocated.

11. The computer program product of claim 10, wherein the calling routine invokes a dynamic memory allocator to extend the fixed page memory interval in response to receiving the code.

12. The computer program product of claim 8, wherein the new entry in the alias page table includes a virtual to physical address mapping translation.

13. The computer program product of claim 8, wherein the second instructions for allocating the new page of memory for use in storing alias page table entries include:
   instructions for determining if a fixed page interval is full;
   instructions for extending the fixed page interval if the fixed page interval is full; and
   instructions for adding a pinned page of a software page table to the fixed page interval.

14. An apparatus for adding entries to an alias page table, comprising:
   means for determining if there is available space in the alias page table for a new entry;
   means for allocating, in response to there not being available space in the alias page table for the new entry, a new page of memory for use in storing alias page table entries;
   means for pinning an entry associated with the new page of memory in a hardware page table in response to allocating the new page of memory for use in storing alias page table entries;
   wherein the means for allocating a new page of memory includes:
      means for determining if a pool of fixed memory pages includes an available fixed memory page; and
      means for allocating the available fixed memory page for use in storing alias page table entries; and
   wherein the means for allocating the new page of memory further includes:
      means for pinning the available fixed memory page in a software page table.

15. The apparatus of claim 14, further comprising:
   means for determining if a pool of fixed memory pages includes available space for the new entry, wherein the means for allocating the new page of memory includes:
   means for pinning a new page of alias page table entries in a software page table in response to a determination that the alias page table and the pool of fixed memory pages do not have available space for the new entry;
   means for determining if a fixed page interval has available space for addition of the new page of alias page table entries; and
   means for adding the new page of alias page table entries to the fixed page interval if the fixed page interval has available space.

16. The apparatus of claim 15, further comprises:
   means for unpinning the new page of alias page table entries in the software page table, if the fixed page interval does not have available space; and
   means for sending a code to a calling routine indicating that the new page of alias page tables could not be allocated.

17. The apparatus of claim 16, wherein the calling routine invokes a dynamic memory allocator to extend the fixed page memory interval in response to receiving the code.

* * * * *

UNITED STATES PATENT AND TRADEMARK OFFICE
CERTIFICATE OF CORRECTION

PATENT NO. : 6,961,840 B2
APPLICATION NO. : 10/262056
DATED : November 1, 2005
INVENTOR(S) : Fleming et al.

It is certified that error appears in the above-identified patent and that said Letters Patent is hereby corrected as shown below:

Col. 8, line 9: after "alias" delete "peg" and insert --page--.

Col. 8, line 55: after "the" delete "now" and insert --new--.

Signed and Sealed this

Twelfth Day of December, 2006

JON W. DUDAS
*Director of the United States Patent and Trademark Office*